Dec. 5, 1933.   O. KURZ   1,937,579
OPTICAL HEAT DETERMINING INSTRUMENT
Filed Sept. 10, 1930
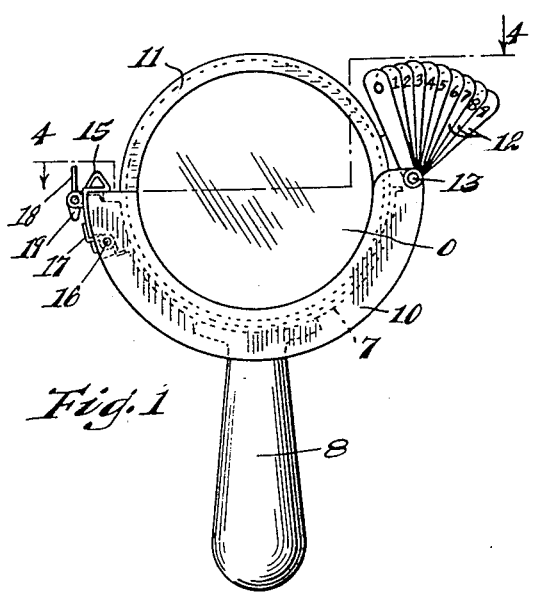
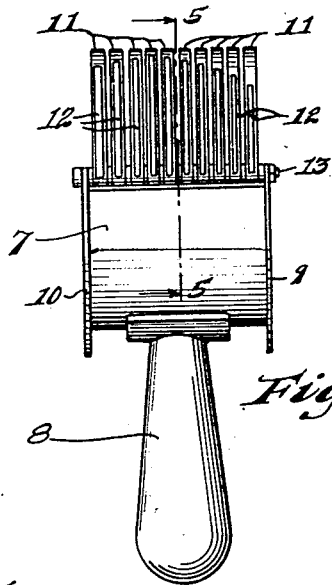
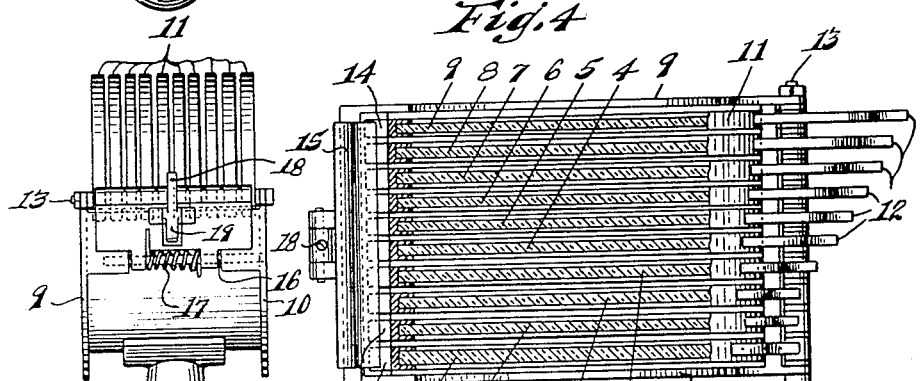
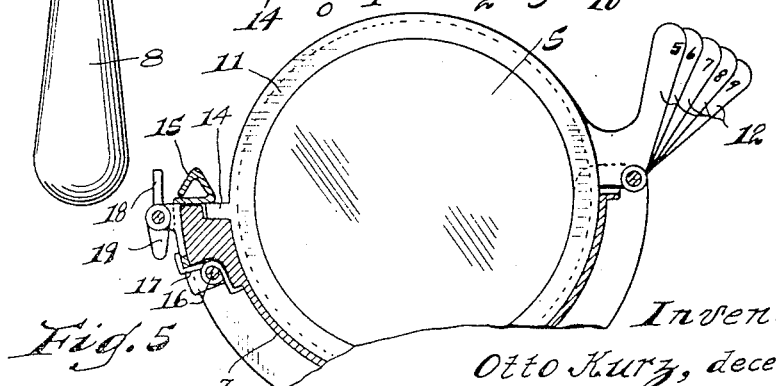
Inventor:
Otto Kurz, deceased
Anna M. Kurz, administratrix,
By Joshua R. H. Potts
Her Attorney.
Witnesses:

Patented Dec. 5, 1933

1,937,579

UNITED STATES PATENT OFFICE 1,937,579

OPTICAL HEAT DETERMINING INSTRUMENT

Otto Kurz, deceased, late of Bensenville, Ill., by Anna M. Kurz administratrix, Bensenville, Ill.

Application September 10, 1930
Serial No. 480,952

7 Claims. (Cl. 88—14)

This invention relates to an optical heat determining instrument, and an object of the invention is the provision of an instrument simple and durable in construction and operation, economical to manufacture, and efficient for the purpose, by means of which the temperature or amount of heat may be determined with sufficient accuracy by observing heated matter or flames through translucent members mounted in the instrument. The instrument is particularly adapted for the observation of heat giving matter of exceptionally high temperature where a thermometer cannot be employed, and where it is necessary to inspect the source of heat at a distance from the object whose temperature or heat is to be measured or determined. A further object is the provision of an improved and simplified instrument adapted to serve the purpose of a pyrometer, but which is convenient to manipulate, of compact size and readily available at all times.

Other objects will appear hereinafter.

The invention consists in the combinations and arrangements of parts hereinafter described and claimed.

The invention will be best understood by reference to the accompanying drawing, forming a part of this specification, and in which:

Fig. 1 is a front elevational view of a device embodying the invention;

Fig. 2 is a side elevational view of the device shown in Fig. 1, taken from the right;

Fig. 3 is a side elevational view, taken from the left of Fig. 1;

Fig. 4 is an enlarged horizontal sectional view, taken substantially on the line 4—4 of Fig. 1; and Fig. 5 is a vertical sectional view, taken substantially on the line 5—5 of Fig. 2.

As illustrated in the drawing, the preferred embodiment of the invention comprises a holding member 7, to which may be secured handle 8. The holding member 7 is preferably semi-cylindrical in general formation, as shown, and is provided with curved side flanges 9 and 10. A plurality of colored translucent members for observation purposes are mounted in parallel relationship, and are adapted to be individually rocked out of line of vision. For this purpose each translucent member, which may be of glass, is preferably circular and is surrounded by a circular frame 11 having an offset portion integral with an operating extension 12. The offset portion on the respective frames are placed in alignment and are perforated to receive a transverse pin 13 by means of which the respective members are individually rockable outwardly from the holding member 7. The several frames 11 are also provided with aligned lugs 14 on the opposite side from the offset portion which, as shown in Fig. 5, may be engaged by a latch plate 15 pivotally mounted on pin 16 and normally held in engaged position by spring 17. Latch 15 is adapted to be disengaged by lever 18, pivotally mounted upon the plate 15 and provided with a shoe 19 adapted to extend through a slot in the plate 15 and bear against the adjacent surface of the member 7. As shown in the various views, the respective operating projections 12 are arranged in overlapping or spread relation so as to facilitate selection, and for the purpose of bearing numerical designations, as shown in Fig. 1.

In the preferred adaptation of the invention, glass No. 0, which is the foremost glass of the instrument, is preferably of a ruby red or amethyst color. This glass may be termed the master glass, and serves to diffuse rays and also has a tendency to equalize the instrument to suit the eyesight of different individuals. It will be understood that in lieu of glass any suitable translucent medium may be employed for testing purposes. The next adjacent glass 1 is preferably of a very light amber color, and the successive glasses 2, 3, 4, 5, 6, 7, 8, and 9, are consecutively graduated to a deeper hue of amber.

To explain the use, supposing that the heat of a flame within a furnace is to be determined, the instrument is held to the eye at a convenient distance from the flame. All of the glasses are preferably rocked outwardly from the holder, except the master glass 0. Thereafter the successive glasses 1 to 9, are individually placed in advance of the glass 0 until light is no longer perceptible through the registering glasses. Thereupon the heat is determined by previous familiarity with the intensity represented by the different glasses, or by means of a chart which may be calibrated to correspond with the successively numbered glasses. After becoming familiar with the use of the instrument, one can readily determine the amount of heat with a high degree of accuracy, and in the case of inspection of fires in furnaces or the like, can readily determine whether or not proper combustion is taking place. It will be understood that if light is still perceptible when glass No. 9 is positioned in advance of glass No. 0, the operator then re-commences with the insertion of glass No. 1 and upwardly.

By having the glasses formed in standard color shades, and a known temperature determined for each glass, the instrument is as practical as many expensive and complicated optical pyrometers, inasmuch as in either case a certain degree of trained observation is required to distinguish between thermodynamic temperature and what is commonly termed "brightness" temperature. Amber has been selected as a color to be employed in different shades for the respective glasses because found highly suitable for the purpose, although it is to be understood glasses of a different color or of a modified shade or hue may be employed.

While the preferred form of construction for carrying the invention into effect has been illustrated and described, this is capable of variation and modification without departing from the spirit of the invention. The invention, therefore, is not limited to the precise details of construction set forth, but is available of such modifications and variations as come within the scope of the appended claims.

The invention having been described, what is claimed as new and desired to secure by Letters Patent is:

1. An optical heat determining instrument, comprising a holding member, a master translucent member of primary color pivotally mounted in said holding member, and a plurality of translucent members graduated as to shade in the same color pivotally mounted in said holding member whereby one or more of said translucent members may be brought into the line of vision.

2. An optical heat determining instrument, comprising a holding member, a master translucent member of primary color pivotally mounted in said holding member, a plurality of translucent members graduated as to shade in the same color pivotally mounted in said holding member whereby one or more of said translucent members may be brought into the line of vision, and a projection upon each of said translucent members for selectively positioning said members in the line of vision.

3. An optical heat determining instrument, comprising a holding member, a master glass of ruby or equivalent color pivotally mounted in said holding member, and a plurality of glasses graduated in shades of amber color pivotally mounted in said holding member whereby one or more of said translucent members may be brought into the line of vision.

4. An optical heat determining instrument, comprising a holding member, a master glass of ruby or equivalent color pivotally mounted in said holding member, a plurality of glasses graduated in shades of amber color pivotally mounted in said holding member whereby one or more of said translucent members may be brought into the line of vision, and a projection upon each of said glasses for selectively positioning said glasses in the line of vision.

5. An optical pyrometer comprising a substantially semi-cylindrical holder and a plurality of translucent members adapted to rest in parallel position within said semi-cylindrical holder, said translucent members being graduated in shade, a transverse pin in said holder pivotally connecting said members to said holder, actuating arms on the respective members, said arms extending radially from said pivot pin and bearing indicia as to the density of their respective members, and said actuating arms being angularly disposed with relation to each other when said members are within the holder to expose the indicia, substantially as described.

6. A device as set forth in claim 5 further characterized by a lug on each of said translucent members diametrically opposite the pivot pin, and a latch on said holder adapted to engage said lugs, substantially as described.

7. A device as set forth in claim 5 in which each of said translucent members is provided with a lug diametrically opposite the pivot pin, a spring latch on the holder for engaging said lugs to retain the members in position, and a lever pivoted adjacent said latch for retracting the same, substantially as described.

ANNA M. KURZ,
*Administratrix of the Estate of Otto Kurz.*